United States Patent
Evans et al.

[15] 3,644,972
[45] Feb. 29, 1972

[54] METHOD FOR PRODUCING BEARING HEMISPHERICAL CAVITIES

[72] Inventors: John L. Evans, Oakland; Anthony G. Rubino, Nutley, both of N.J.

[73] Assignee: The Singer Company, New York, N.Y.

[22] Filed: June 24, 1969

[21] Appl. No.: 836,025

[52] U.S. Cl. ............................29/149.5, 29/441
[51] Int. Cl. ..........................B21d 53/10, B23p 11/00
[58] Field of Search ..............29/149.5 B, 441; 156/212; 264/242, 262; 18/39, 34

[56] References Cited

UNITED STATES PATENTS

| | | |
|---|---|---|
| 2,838,436 | 6/1958 | Clingman.................................156/212 X |
| 3,220,093 | 11/1965 | White........................................29/441 X |
| 3,238,602 | 3/1966 | White........................................29/149.5 |
| 3,259,963 | 7/1966 | White........................................264/242 X |
| 3,358,065 | 12/1967 | Enders........................................264/262 X |

Primary Examiner—Thomas H. Eager
Attorney—S. A. Giarratana and S. M. Bender

[57] ABSTRACT

Method of manufacturing high-accuracy bearing for gas gyro using casting techniques. The bearing cavity is formed using a die or tool in the form of an accurately machined half sphere fastened to a flat baseplate. The baseplate is fitted with locating pins that locate the outer diameter of the housing half. The die used in said method is an aluminum alloy coated with a thin film of a silicone rubber coating.

2 Claims, 2 Drawing Figures

Patented Feb. 29, 1972

3,644,972

INVENTORS
JOHN L. EVANS
ANTHONY G. RUBINO
BY

S. A. Giarratana
ATTORNEY

METHOD FOR PRODUCING BEARING HEMISPHERICAL CAVITIES

BACKGROUND OF THE INVENTION

The present invention relates to gyro gas bearings and more particularly to a highly accurate gas bearing which can be readily and inexpensively produced.

Although in most of the inertial systems electronic components are used, it is often possible to use pneumatically operated components. Pneumatic components are cheap, reliable and impervious to radiation. These in turn readily lend themselves to further extension of the use of gas in the system, such as gas drive, and, with gas drive, it is again natural to use gas bearings.

One of the principal sources of cost in the fabrication of spherical gas bearing gyroscopes is the spherical cavity in the gas bearing. This part is currently being machined with single point tooling and amounts to at least 10 percent of the machining cost of the gyro.

The purpose of the cavity is to serve as the spin bearing and gimballing in the gyro. Two halves are bolted together around a pressurized ball with an inertia rim attached to form the gyro rotor. The gap which separates the ball from the housing is in the order to $5 \times 10^{-4}$ inches. This puts an extreme roundness and size requirement on the parts that thus far has been met only by using single point tooling.

The present invention is directed to an arrangement for getting the same accuracy using a casting technique that is less expensive. Heretofore, casting was ruled out because of shrinkage after casting and distortion of the cast parts. The present approach minimizes shrinkage and eliminates the possibility that stresses caused by the casting will cause distortion of the parts. Furthermore, the present invention also provides a means for accurately locating the center of the spherical cavity with respect to the dividing seam, and the outer circumference of the part. The accurate location of these two dimensions is essential to the alignment of two halves to make one perfect spherical cavity.

SUMMARY OF THE INVENTION

To overcome the defects of the prior art, the present invention, broadly speaking contemplates a method of manufacture using casting techniques by using a die or tool for forming the bearing ball.

This tool used in the method of manufacture consists of an accurately machined half sphere fastened to a flat baseplate. This baseplate is also fitted with locating pins that locate the outer diameter of the housing half with respect to the center of the hemisphere. Therefore the center is located as accurately as the pins permit in azimuth and as accurately as the hemisphere is made in depth.

The advantage of this approach is that the cast film is thin. The part on which the film is cast can be roughly machined cheaply. The stresses in the thin film can't distort the roughly machine's part even if they are high because the net force is small. The film's thinness also reduces the molding shrinkage to substantially zero.

The invention as well as the objects and advantages thereof will become more apparent from the following detailed description when taken together with the accompanying drawings.

DETAILED DESCRIPTION

According to the present invention concept, it is first necessary to make a tool or die of exact dimensions. This is done by machining an aluminum alloy known as 2024 aluminum alloy of cylindrical shape. The 2024 aluminum alloy has the following composition:

| Si | Fe | Cu | Mn | Mg | Cr | Zn | Ti | Others |
|---|---|---|---|---|---|---|---|---|
| 0.50 | 0.50 | 3.8–4.9 | 0.30–0.9 | 0.05 | 0.25 | | 0.15 | 0.05 | and the balance aluminum.

This die is then machined to the desired hemisphere shape with a slightly undersized dimension from the desired finished diameter and the hemisphere is coated with a material sold under the trade name of RTV 630. This material is a room temperature vulcanizing silicone rubber that utilizes an addition cure mechanism. It is a linear dimethyl polysiloxane with a low cross link density having the general formula:

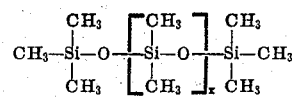

where the value of X is such that the molecular weight of the polymer is between 100 and 100,000. The silicone rubber material is coated onto the die and cured overnight at room temperature on the die. There is then a post cure treatment for 1 hour at 125° C.

Figure 1:
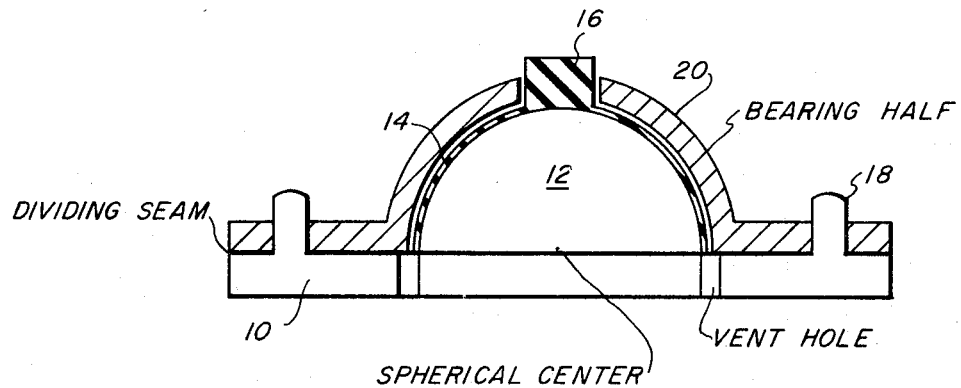
FIG. 1 is a cross-sectional view of the socket forming fixture.

This coated die is shown in FIG. 1 and has a baseplate 10 with a hemisphere 12 machined thereon. The hemisphere 12 is coated with the silicone rubber coating 14 about 1/100–1/1000 of an inch thick with a knob 16 to fix the location of the gas aperture. To define the location of the workpiece which is to be shaped by the die, locating pins 18 are placed on the base 10.

To make the necessary bearing structure contemplated herein, the epoxy has the following structural formula:

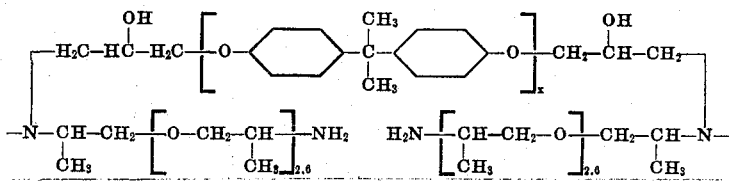

where X is approximately from about 1 to about 2. This epoxy resin can be made by mixing about 100 parts by weight of commercially available material sold under trade name DOW D.E.R. 332 to about 32 parts by weight similar commercially available material POPDA 230. The coating is dried overnight at room temperature (18 hours) and cured for 1 hour at 70° C. The thickness of the coating is between about one-thousandths inch to about one-hundredth inch.

A housing half 20 is machined to its final dimensions with the exception of its spherical half cavity. This is roughly finished a few thousandths of an inch oversized. The interior of the cavity is painted with an epoxy resin. This epoxy resin is a liquid bisphenol epichloro-hydrin type resin having an epoxy equivalent weight (E.E.Q.170-180) with a hardener of the polyoxy propylene amine type having the formula:

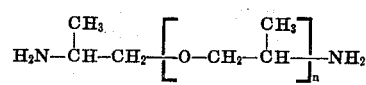

where $n$ is approximately 2.6. The housing half 20 thus prepared is pressed down over the tool or die as shown in FIG. 1 and held in place until the resin is cured. When it is withdrawn there is a thin film of resin which is formed to the contour of the tool.

Figure 2:
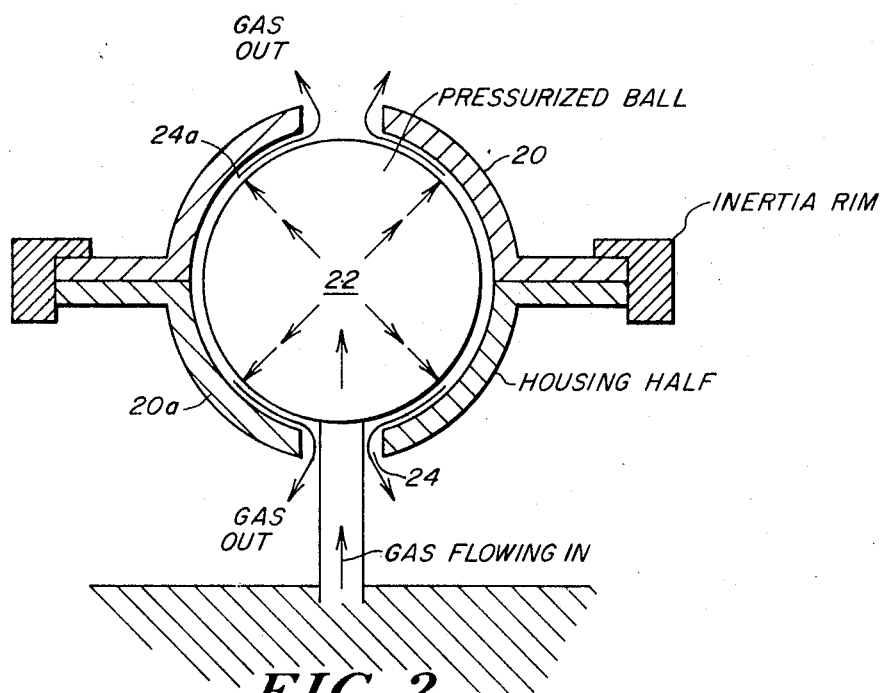
FIG. 2 is a cross-sectional view of an assembled bearing housing.

The gyro housing half 20 is shown in FIG. 2 disposed over the bearing ball 22. Gas is fed in through the aperture 24 which was originally formed by knob 16. Gas flows through the bearing ball 22 and out through gap 24a. The bearing ball 22 is stationary and the gyro housing halves 20, 20a rotate around the bearing ball.

In the present invention, the thin rubber film is very accurately shaped because it was formed by a precise hemisphere cavity. It retains its shape because it is thin and is bonded to a metal substrate. The rubber adheres to the metal substrate only because it has been specially primed. Silicone rubber normally does not adhere to anything. Thus, the epoxy can easily be removed.

We claim:

1. The process of making a bearing housing half portion having a spherical inner half cavity, for use in a gas bearing gyro, comprising the steps of roughly machining the spherical inner half cavity a few thousands of an inch over size, painting the interior surface of said cavity with a liquid bisphenol epichlorohydrin epoxy resin and a polyoxy propyleneamine type hardener, pressing said bearing portion having the half cavity with the resin thereon over a die, said die comprising in combination, a die body and a thin film, said die body being composed of an aluminum alloy, said die body having a flat base portion and a hemisphere portion mounted thereon, said hemisphere portion being coated with said thin film, said thin film being composed of silicone rubber, the silicone rubber thickness being determined by a very accurately machined master mold, and, holding the assembly in place until the thin film of resin is cured.

2. The process of claim 1, wherein the epoxy has the following structural formula:

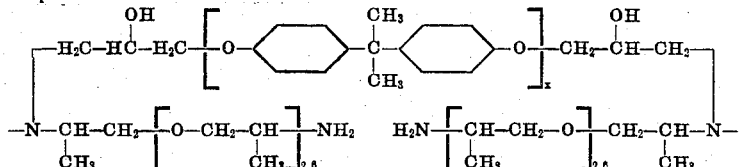

where X is approximately from about 1 to about 2 and the hardener has the following structural formula:

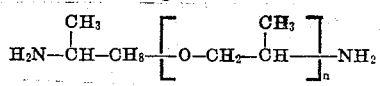

where $n$ is approximately 2.0–2.6.

* * * * *